United States Patent [19]  [11] Patent Number: 4,459,434
Benning et al.  [45] Date of Patent: Jul. 10, 1984

[54] HOME TELEPHONE EXCHANGE

[75] Inventors: Gordon D. Benning, Ottawa; Brian J. Pascas; Robert K. Blackhall, both of Kanata; Paul S. Wilker, Ottawa; Graham A. Neathway, Almonte, all of Canada

[73] Assignee: Mitel Corporation, Ontario, Canada

[21] Appl. No.: 286,871

[22] Filed: Jul. 20, 1981

[30] Foreign Application Priority Data

Mar. 23, 1981 [CA] Canada .................................. 373591

[51] Int. Cl.$^3$ ...................... H04M 1/60; H04M 1/72; H04M 3/42; H04M 11/00
[52] U.S. Cl. ................................... 179/81 B; 179/2 A; 179/84 T
[58] Field of Search .................. 179/1 H, 1 HF, 81 B, 179/99 P, 99 A, 2 A, 37, 84 T, 81 R, 84 R, 84 A, 100 L

[56] References Cited

U.S. PATENT DOCUMENTS

| | | | |
|---|---|---|---|
| 3,904,834 | 9/1975 | Shinoi et al. | 179/1 HF X |
| 4,079,212 | 3/1978 | Sasai | 179/99 P |
| 4,088,846 | 5/1978 | McEowen | 179/99 A |
| 4,097,690 | 6/1978 | Kuntz et al. | 179/2 A |
| 4,100,375 | 7/1978 | Noller | 179/2 A |
| 4,196,317 | 4/1980 | Bartelink | 179/37 |

Primary Examiner—Thomas W. Brown
Attorney, Agent, or Firm—Laff, Whitesel, Conte & Saret

[57] ABSTRACT

A telephone system used in the home which provides special services such as intercom, paging, remote turn on or off of power contacts, audio monitoring, etc. A central control is interposed between the subscriber's line and the local wiring in his home, or is connected in parallel thereto. One or more telephone subscriber sets are plugged into the wiring as usual, contacting the tip and ring leads. In the present invention, remote special service circuits are plugged into the telephone line, contacting the remaining two conductors, referred to below as the black B and yellow Y leads. Each of the remote special service circuits has a specialized function, e.g., a typical circuit will have a speaker, an amplifier for driving the speaker, and a circuit for enabling the amplifier and connecting it across the black and yellow leads once an address has been received on the black and yellow leads. Preferably, a housing containing this type of module has a socket into which a subscriber's telephone set can be plugged, and the circuit itself is connected to the local telephone line, connecting the telephone set directly or via a switch to the tip and ring leads and connecting the amplifier and enabling circuit to the black and yellow leads. Each telephone set thus will have a local speaker associated with it. However in a typical installation there could well be special service circuits of the latter type connected to the local telephone line without having a telephone set connected into it, or located adjacent thereto.

19 Claims, 15 Drawing Figures

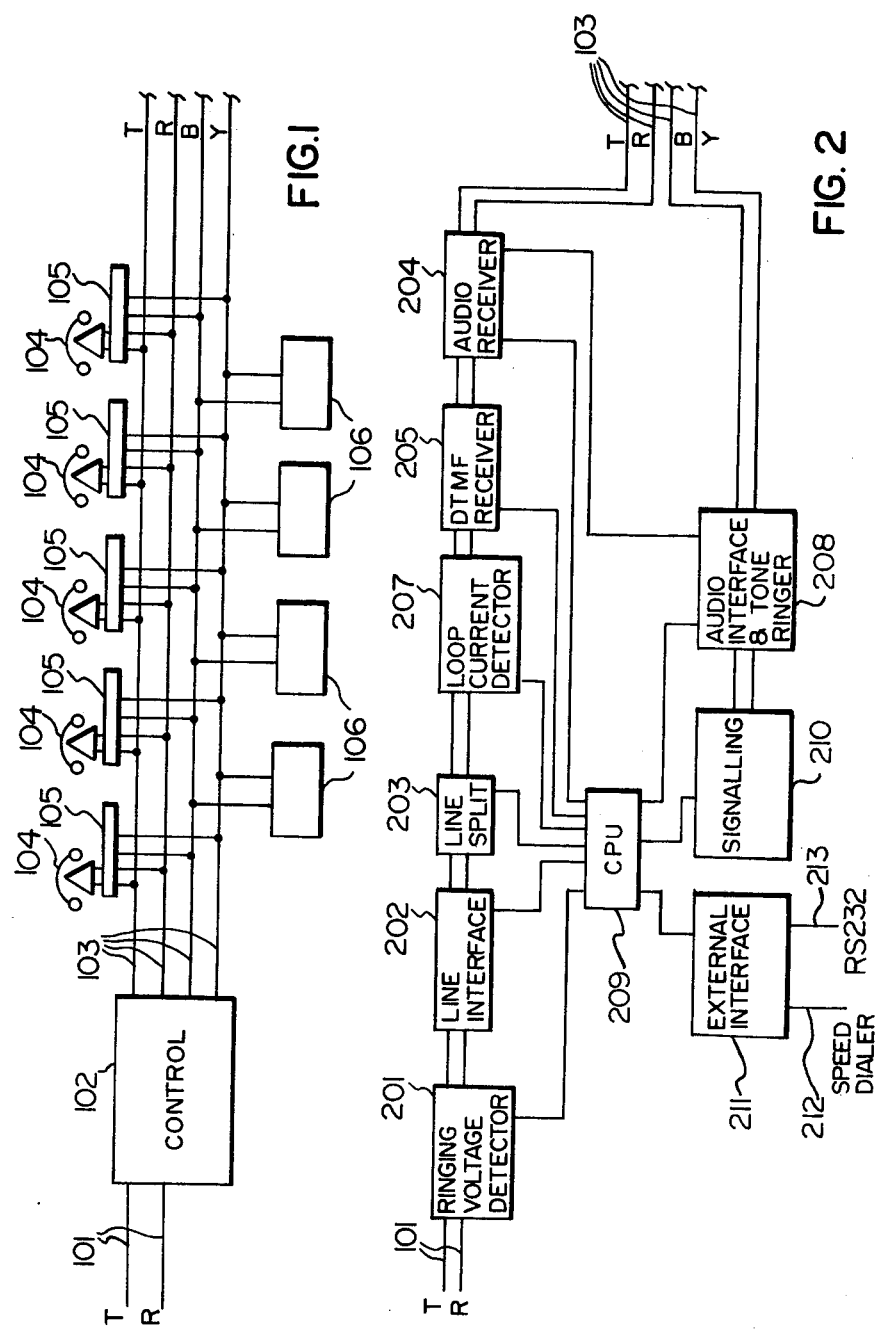

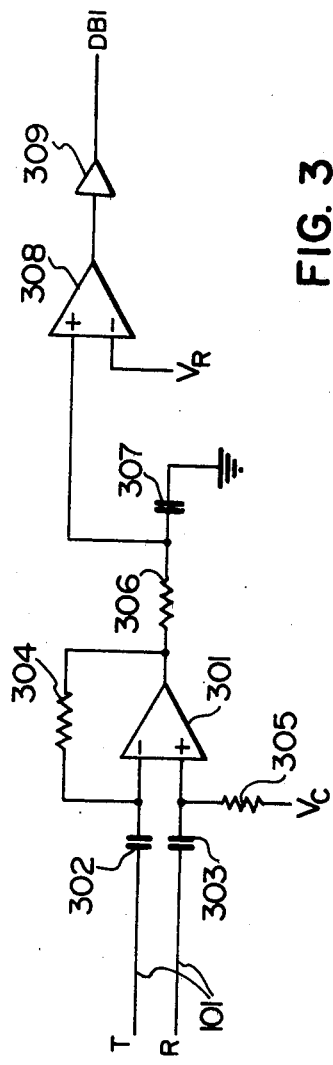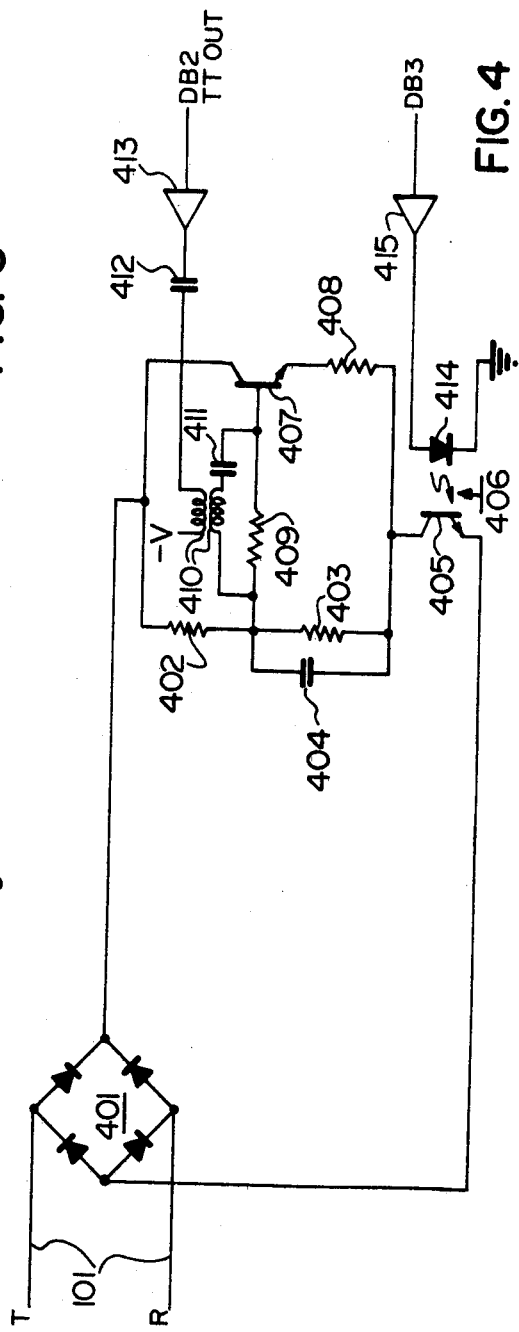
FIG. 3
FIG. 4

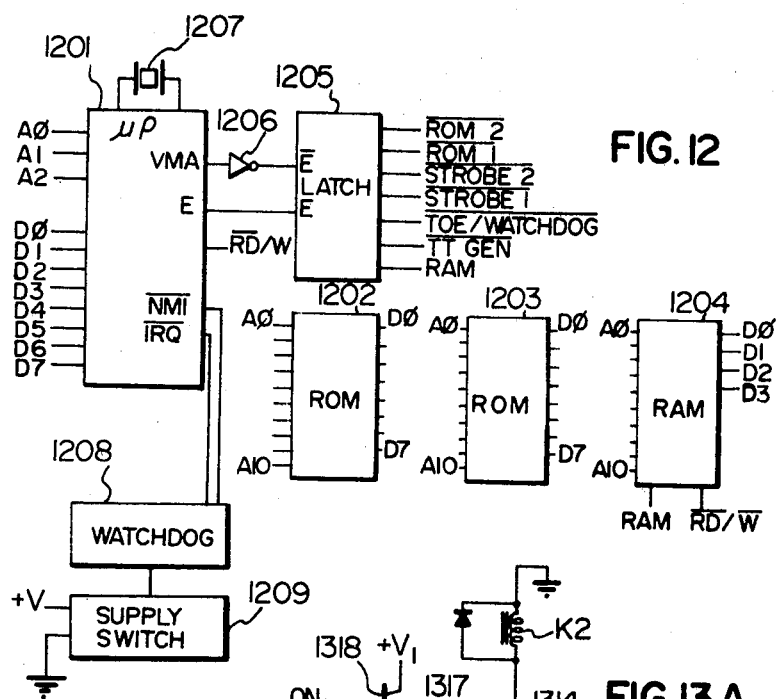
FIG. 12
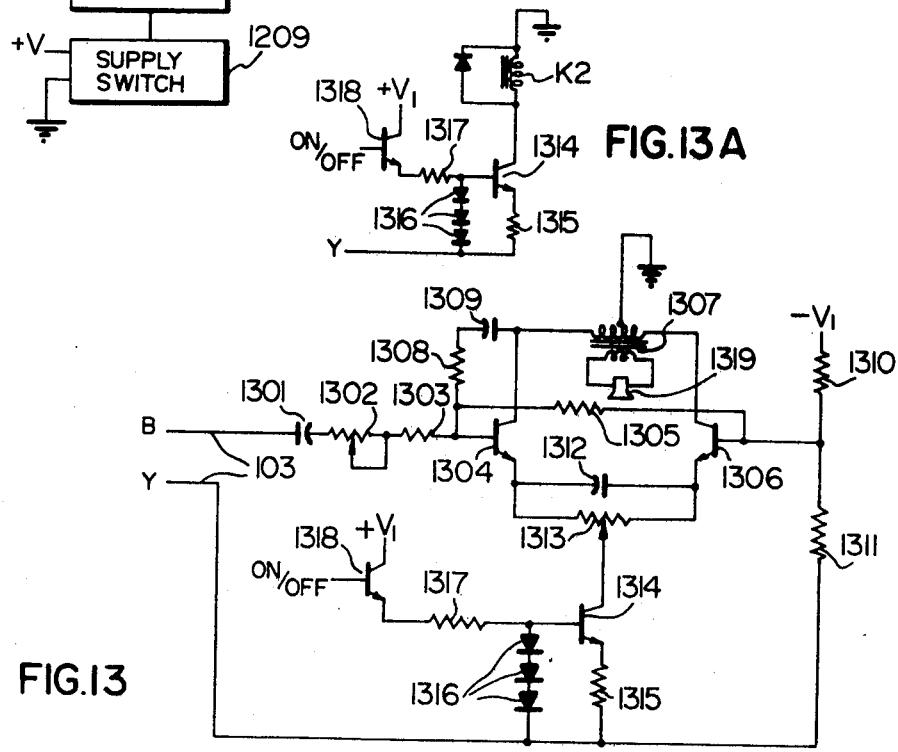
FIG. 13A
FIG. 13

HOME TELEPHONE EXCHANGE

This invention relates to telephone systems and particularly to a telephone system used in the home which provides special services to the telephone subscriber.

Telephone system subscribers' lines from the switching office typically contain four wires, usually labelled TIP, RING, SLEEVE, and GROUND. The subscriber's line is usually terminated in the subscriber's home on a telephone block, and the house is typically wired with a four conductor cable. However, for normal subscriber telephone service, the telephone set is connected across the tip and ring leads, and the remaining two conductors (usually coloured black and yellow, respectively) remain redundant. The present invention utilizes all four wires to provide special services within the subscriber's home, of the type normally associated with a PABX, as well as others.

Typical of the kinds of services which can be provided using this invention are tone ringing, paging, audio monitoring of a location within the home from another location within the home, operation of switch contacts from a remote location either inside or outside the home whereby apparatus, appliances or the like can be turned on or off, etc.

On the other hand, normally the only functions which can be provided at the home are the interconnection of extension telephones to the telephone line.

In the present invention, a central control is interposed between the subscriber's line and the local wiring in the home. One or more telephone subscriber sets are plugged into the wiring as usual, contacting the tip and ring leads. In the present invention, remote special service circuits are plugged into the telephone line, contacting the remaining two conductors, referred to below as the black B and yellow Y leads. Each of the remote special service circuits has a specialized function, e.g., a typical circuit will have a speaker, an amplifier for driving the speaker, and a circuit for enabling the amplifier and connecting it across the black and yellow leads once an address has been received on the black and yellow leads. Preferably, a housing containing this type of module has a socket into which a subscriber's telephone set can be plugged, and the circuit itself is connected to the local telephone line, connecting the telephone set directly or via a switch to the tip and ring leads and connecting the amplifier and enabling circuit to the black and yellow leads. Each telephone set thus will have a local speaker associated with it. However in a typical installation there could well be special service circuits of the latter type connected to the local telephone line without having a telephone set connected into it, or located adjacent thereto.

In one embodiment, when a ringing signal is received from the local switching office via the subscriber's line, the central control splits the local telephone line from the subscriber's line, applies local battery to the black and yellow leads, addresses each of the speakers, and applies ringing tone thereto. Consequently rather than the harsh ringing bell or buzzer associated with telephone ringing, a pleasant ringing tone is heard throughout the house in the environment of each of the speakers, including in the environment of each of the telephones plugged into the speaker housing as described above. The central control monitors the tip and ring leads of the local telephone line, and as soon as a subscriber answers by lifting a handset, thus placing the tip and ring leads an off-hook condition, the central control removes local battery from the black and yellow leads, inhibits the application of tone ringing, and reconnects the tip and ring leads to the subscriber's line leading to the local telephone office. The local subscriber can thus converse with the calling party over the continuous tip and ring leads.

The local subscriber can also either enable or establish communication with any or all of the remote special service circuits. The telephone handset is lifted, the hookswitch is flashed, and the identification number of the special service is dialled, thus switching it on. The tip and ring leads are connected to the black and yellow leads, and are split from the subscriber's line connected to the local switching office. The local subscriber can speak into his telephone handset microphone thus effecting a page. Alternatively, the number dialled could be designative of a remote special service circuit which contains a switch, thus operating it. The switch could be connected to lights, appliances, etc.

The central control can also be connected to a special service circuit for accessing a speed dialer, an RS232 type interface, etc. In this case the local subscriber flashes his switchhook, dials the access code for the speed dialer followed by one or two digits which designate the number to be automatically dialled.

The invention in general is a service circuit for local telephone lines in buildings wired with quad telephone conductors, a first two of which are connected to a subscriber's line connected to a remote switching machine, comprising a circuit for splitting the local telephone lines from the subscriber's line, on receipt of a first command signal from the first two of the conductors, a circuit for addressing, enabling and providing local battery for one or more remote special service circuits on the second two of the conductors upon receipt of a second command signal from the first two of the conductors, whereby a special service circuit connected to the local telephone line internally of the building and isolated from the remote switching machine can be enabled corresponding to the commands.

According to a further embodiment, the tip and ring leads are continuous to the switching office, and are not split. In this case a central control is connected in parallel with the tip and ring and black and yellow leads. However each special service circuit to which a local telephone set is connected contains a splitting circuit. Consequently when a telephone set goes off hook, it is not connected to the tip and ring leads immediately. The telephone set can be connected directly to the black and yellow leads, whereby all digits dialed are recognized by the central control, which activates remote special service circuits described above. However, upon dialing a predetermined digit such as the digit 9, or, alternatively, flashing the switchhook, a local detector in each of the special service circuits detecting the predetermined digit or switchhook flash switches the telephone set to the tip and ring leads. Upon being connected thereto, the central switching office dial tone is heard in the handset, and the local telephone set can then dial an outgoing call.

A better understanding of the invention will be obtained by reference to the detailed description below, and to the following drawings, in which:

FIG. 1 is a general block diagram of one embodiment of the invention,

FIG. 2 is a block diagram of the central control portion of the invention,

FIG. 3 is a schematic diagram of the ringing detector block of FIG. 2,

FIG. 4 is a schematic diagram of the termination and line interface.

FIG. 12 is a schematic diagram of the CPU,

FIG. 13 and FIG. 13A form schematic diagrams of remote special service circuits.

Figure 14:
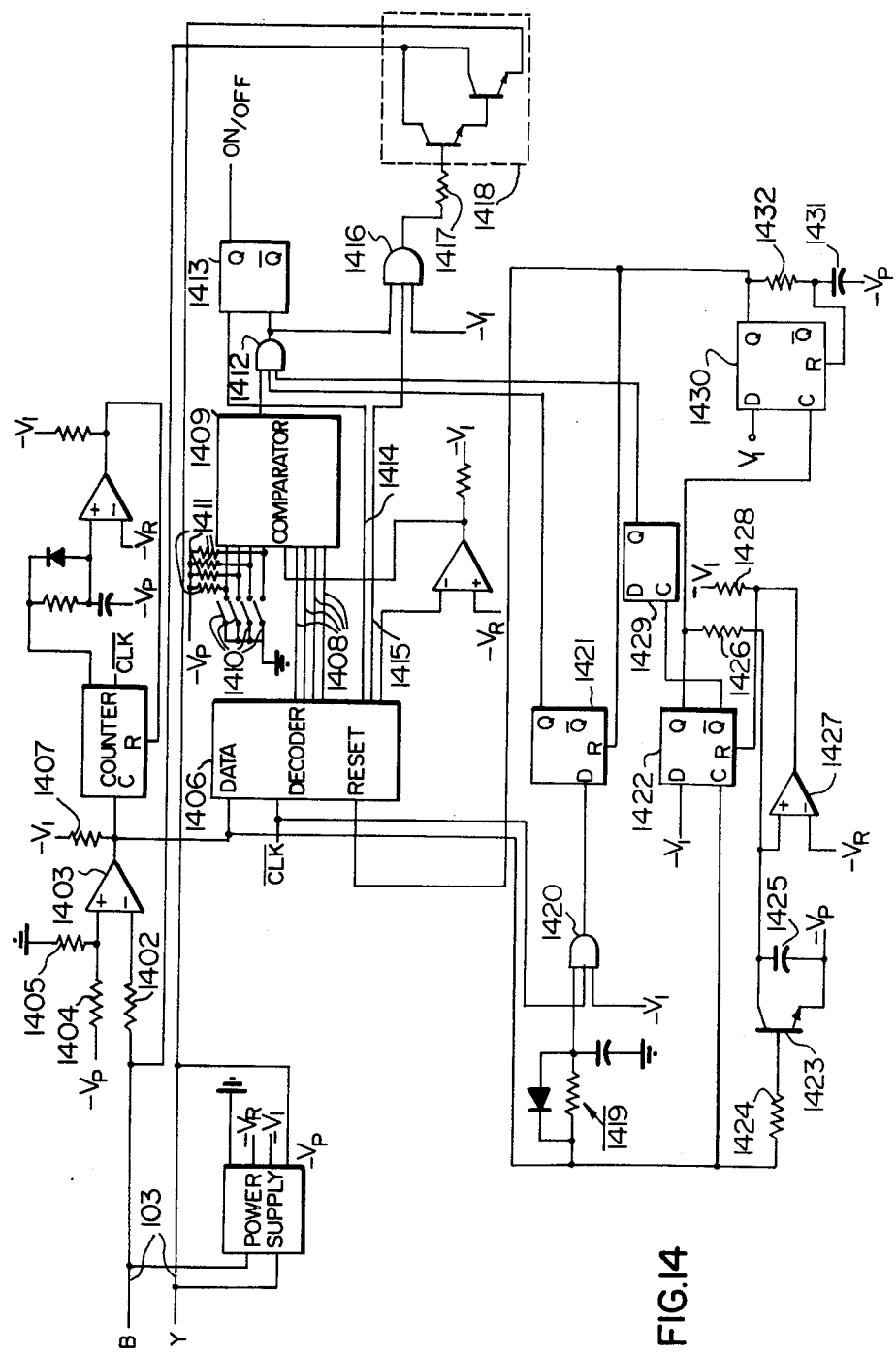

FIG. 14 is a schematic diagram of the control circuit of a remote special service circuit.

Turning now to FIG. 1, the tip and ring leads of the subscriber's line 101 which is connected to the local switching office connects to the central control of this invention in the subscriber's home. Typically the central control is contained in a housing which is attached to the utility board within a subscriber's home, e.g., in the basement, utility room, etc. The local telephone line 103 consisting of a tip T, ring R, black B, and yellow Y individual conductors in a quad conductor telephone line is also connected to the central control 102. The central control itself interconnects the local telephone line 103 with the subscriber's line 101 internally, as required, and as will be described below.

FIG. 1 shows five subscriber telephone sets 104 which might be used in a typical installation. Of course only one, or any number could be used. Many subscribers' homes are wired with five modular connectors to which up to five telephones can be connected, but the invention is not limited to this number. The subscriber's telephone sets 104 are connected directly to the tip and ring leads of the local telephone line, preferably through a special service circuit 105. The telephone sets need not be connected through the special service circuit 105, but it forms a convenient method of making the connection, since each special service circuit is connected to the local telephone line; the tip and ring leads are connected directly through to the subscriber's telephone set. In addition, each special service circuit contains a speaker connected to the output of an amplifier, and an enabling circuit, the amplifier and the enabling circuit being connected to the B and Y leads.

Other special service circuits 106 are also connected to the B and Y leads, at locations as desired. One of such circuits can contain a speaker, amplifier and enabling circuit as noted above, and can be located at the front door of the subscriber's home, whereby it can be used as a door answering intercom. Another special service circuit 106 can be located in a basement playroom, where it can be used for paging or as one portion of a loudspeaking intercom, and another special service circuit 106 can contain a microphone connected to the input of an amplifier, the output of which is connected with an amplifier enabling circuit to the B and Y leads, whereby it can be used as one portion of a baby monitor in conjunction with one of the loudspeaking special service circuits. A further special service circuit 106 can contain a switch, operated by an enabling circuit, which is connected to the B and Y leads, whereby the switch can be closed upon its being enabled, facilitating the turning on or turning off of lights, appliances, etc.

FIG. 2 depicts the central control in more detailed block diagram. Tip and ring leads 101 are connected to the central control as well as the local telephone line 103 as described earlier. A ringing voltage detector 201 is connected to the tip and ring leads 101, in parallel with a line interface circuit 202. The tip and ring leads from the line interface circuit are connected to a line split circuit 203.

An audio receiver 204 is connected in parallel with a dial tone multifrequency DTMF receiver 205 to the local telephone line 103. A loop current detector 207 is also connected to the local telephone line 103, as well as the other side of the line split circuit 203.

An audio interface and tone ringer circuit 208 is connected between the audio receiver 204 and the B and Y leads of local telephone line 103.

A central processing unit 209 interfaces and communicates with ringing voltage detector 201, line interface 202, line split circuit 203, audio receiver 204, DTMF receiver 205, loop current detector 207, and audio interface and tone ringer 208.

A signalling circuit 210 is connected to the audio interface and tone ringer 208, and is connected for control to CPU 209. An external interface circuit 211 is also connected to CPU 209, and has external ports 212 and 213, e.g., for connection to a speed dialer, to a device via an RS232 or the like interface, etc.

For the description of operation below, consider FIGS. 1 and 2 together.

TONE RINGING

Assuming that an incoming call is being received, ringing will appear on the tip and ring leads 101. The ringing voltage detector 201 detects the ringing voltage and applies a signal to CPU 209. CPU 209 applies a signal to line split circuit 203, which splits the tip and ring leads 101 from the tip and ring leads in local telephone line 103 and applies local battery to the tip and ring leads, thus ensuring that ringing (e.g., 90 volts at 20 hertz) is not passed down the local telephone line 103, and thus does not ring the ringer in any of the telephone sets 104.

CPU 209 then sends a signal to audio interface and tone ringer 208 to apply local battery to the B and Y leads of the local telephone line 103, and cuts through signalling circuit 210. Signalling circuit 210 sends a command, containing an address, to each of the remote special service circuits 106 which contain an amplifier and speaker. These circuits are thus activated and the inputs of the amplifiers are connected through to the B and Y leads. The tone ringer applies tone ringing to the B and Y leads, which is received by the activated amplifiers, thus providing tone ringing throughout the house in the environment of each of the activated remote special service circuits.

The subscriber lifts his handset, his telephone thus applying low resistance across the tip and ring leads of the local telephone line 103. The loop current detector, detecting a large increase in the current flow from the local battery applied to the tip and ring leads from the line split circuit 203, sends a signal to the CPU 209 that the subscriber has gone off-hook. The CPU then sends commands to the audio interface and tone ringer circuit which in response removes tone ringing and local battery from the B and Y leads. The CPU 209 also sends a signal to the line split circuit 203 to remove local battery from the T and R leads of the local telephone line 103, and to cut through the T and R leads 101 to the T and R leads 103. The off-hook condition of the T and R leads is a signal to the local switching office to cut-off ringing, and to connect the calling subscriber to the local called subscriber.

As an alternative, the CPU could send a signal to line interface circuit 202 to apply a low resistance simulating the local handset off-hook resistance across the T and R leads 101 just prior to connecting through T and R leads 101 to T and R leads 103, then after effecting the connection, removing the low resistance across the T and R leads 101 in the line interface circuit 202. This removes all possibility that a small number of cycles of 20 hertz ringing is applied to T and R leads 103, in case the local switching office is slow at removing the ringing signal.

The local subscriber can now continue his conversation with the outside party.

OUTGOING CALL

In an outgoing call, the local subscriber removes his handset, and since the T and R leads 103 are normally connected through to T and R leads 101, he dials a called subscriber as normal. The loop current detector 207 and a DTMF receiver 205 monitor the outgoing dialling signal for a hookswitch flash (or in the alternative a predetermined dialled digit, such as a "9"), but if none is detected, the outgoing call proceeds as normal and the central control does not operate.

HOLD

Assuming that an incoming or outgoing call is in progress, and the local subscriber wishes to place the line on hold, he flashes his hookswitch. The loop current detector 207 detects the hookswitch flash and sends a signal to the CPU indicating that this has occurred. The CPU sends a signal to the line interface circuit 202 to apply a terminating resistance across and T and R leads 101, and sends a further signal to line split circuit 203 to split and T and R leads 103 from T and R leads 101. Thus the subscriber's line connected to the local switching office remains terminated, but disconnected from the local telephone set.

The local subscriber can either keep the line on hold as long as desired, or can dial command digits to CPU 209 which can then cause one or more special service circuits to be connected through to the local telephone set for paging or the like, as will be described below.

When the hold function is to be terminated, the local subscriber flashes his hookswitch again, which flash is detected by loop current detector 207, which sends a signal to CPU 209 indicating that this has occurred. In response CPU 209 sends a signal to line split circuit 203 to remove the split and reconnect tip and ring leads 101 and 103. A confirmation signal is sent from line split circuit 203 to CPU 209 which then sends a signal to line interface 202 to remove the terminating resistance across tip and ring leads 101. The call between the local subscriber and the subscriber connected to the local telephone switching office can now continue as usual.

PAGING AND DOOR ANSWERING

Whether or not a telephone call is in progress, to initiate the page or door answer special service, the local subscriber flashes his switchhook and remains off-hook with the telephone set 104 which he is using. As described earlier, the loop current detector 207 detects the flash, and applies a signal to CPU 209 advising it of the detection. CPU 209 causes the tip and ring lead 101 to be terminated via line interface circuit 202 and causes the line to be split between tip and ring leads 101 and tip and ring leads 103 by the line split circuit 203, all of which was described earlier.

The subscriber now dials a predetermined code which indicates which remote special service circuits and/or which features are to be implemented. For example, if he wishes all remote special service circuits which contain an amplifier to be activated, he would dial the digits "77", for example. If he wishes only a single special service circuit containing an amplifier to be activated, he would dial a single digit which indicates the station number (e.g., 1–5). Depending on whether the dialled digits are dial pulse or multifrequency, either loop current detector 207 or DTMF receiver 205 recognizes the digits (following the hookswitch flash), and sends a signal to CPU 209 which is indicative of the service and stations selected.

The CPU sends a signal to audio interface and tone ringer 208 to apply local battery to the B and Y leads, and sends a signal to signalling circuit 210 which applies a signal to the B and Y leads in order to enable the remote special service circuit.

The amplifiers in the remote special service circuit or circuits which have been enabled are powered by the local battery noted above, and are connected to the B and Y leads.

The CPU 209 applies a signal to audio receiver 204 and audio interface and tone ringer 208 to connect T and R leads 103 to B and Y leads 103 via audio receiver 204 and audio interface and tone ringer circuit 208. The signal from the microphone of the subscriber's handset thus is amplified by the amplifier in the enabled special service circuits.

It is preferred, that when the tip and ring leads are split, for whatever reason, that an internal dial tone should be applied to tip and ring leads 103 (preferably through line split circuit 203), which confirms to the local subscriber that the line has been split. Once a first command digit has been dialled, the local dial tone should be cut off.

Similarly, it is preferred (but is not essential) that when the special service circuit is connected to the black and yellow leads, that a short acknowledgement tone should be applied to the tip and ring leads 103. This can be provided through the line split circuit 203.

Preferably, the signal to the remote special service circuit consists of a bit designating whether an acknowledgement of enablement is desired, followed by a remote special service circuit identity digit, followed by an "on" or "off" designating digit, following a parity digit.

The acknowledgement from the remote special service circuit can be a single bit.

Preferably a 0 bit consists of a 10 microsecond pulse followed by a 20 microsecond space. A 1 bit consists of a 20 microsecond pulse followed by a 10 microsecond space.

When the paging function has been completed, the subscriber goes on hook, which is detected by loop current detector 207. A signal is applied to the CPU which sends a signal to line split circuit 203 to cause it to connect tip and ring leads 101 to tip and ring leads 103, preceded by a signal to audio interface and tone ringer 208 and audio receiver 204 to remove the local battery from the B and Y leads and to remove the connection between the T and R leads and the B and Y leads via audio receiver 204 and audio interface and tone ringer 208. The circuit is thus restored to its idle normal condition.

INTERCOM AND DOOR ANSWER

The intercom function can be effected in one or both of two ways. The local subscriber uses the paging function to a particular remote special service circuit amplifier, paging a party thereby. The second party lifts his handset, which is connected to the tip and ring leads 103, and a conversation via the telephone sets can continue.

A second way of implementing the intercom function, which is also applicable to the door monitor function, is to provide a two-way voice switched amplifier in the remote special service circuit, in place of the amplifier previously mentioned. In this case, the party using the local telephone set, in speaking, causes the remote switching amplifier to switch, thus amplifying his voice at the remote special service circuit speaker. When the other party wishes to speak, the switching circuit reverses the direction of the amplifier, thus amplifying sounds received by the local speaker, applying them to the B and Y leads, which are received on the T and R lead 103 and received by the subscriber.

CONTACT OPERATE

In order to operate switches, e.g., to turn on or off lamps, appliances, etc., from one of the telephone sets 105, the handset is removed and the hookswitch is flashed. The line is split and the tip and ring leads 101 terminated as described earlier.

The subscriber dials a digit specifying the desired feature (e.g. power contact), then a digit designating the remote special service circuit containing the power contact (which could be, for example one of eight circuits), followed by a digit designating whether the contact should be switched on or off. These command signals are detected either by the loop current detector 207 or DTMF receiver 205, and corresponding signals are applied to CPU 209.

The CPU then applies a signal to audio interface and tone ringer circuit 208 and to signalling circuit 210, the latter applying an address and enabling signal to the B and Y leads. As a result, the particular remote special service circuit which was designated is enabled, and the switch contained therein is switched on or off as commanded.

An acknowledgement pulse is returned on the B and Y leads, received by the signalling circuit 210 which applies a corresponding signal to CPU 209. CPU 209 causes the line split circuit 203 to apply an acknowledgement tone to T and R leads 103, thereby advising the local subscriber that the commanded function has occurred. The local subscriber then hangs up his handset, resulting in the CPU causing the line split circuit 203 to reconnect T and R leads 101 with T and R leads 103, thus idling the central control. The remote power switch should remain in the condition indicated by magnetic or other form of latching.

ONE WAY MONITORING

To effect the room monitor function from a special service circuit, the local subscriber flashes his hookswitch, dials a predesignated series of numbers, thus causing a predetermined remote special service circuit to become connected to the B and Y leads, and to the T and R leads 103 (after splitting the line), as described above with respect to the paging feature. However in this case a microphone and amplifier feeding the black and yellow leads can be used to replace the speaker and amplifier in FIG. 13 or the relay in FIG. 13A, and which is enabled instead of the reverse-directed amplifier used in paging. The local subscriber can now monitor, over his telephone set, sounds in the environment of the remote special service microphone.

In the case of e.g. baby room monitoring, it is inconvenient or undesirable for the subscriber to retain his handset at his ear for a considerable period of time, such as the duration of an evening. In this case, after selecting a remote special service circuit containing a microphone which is connected to the local telephone line 103 in the baby's room, before hanging up the subscriber dials a remote special service circuit containing an amplifier, in the same manner as before. The amplifier would of course be located in the environment in which he intends to remain, to effect the monitoring. Accordingly sounds picked up by the microphone in the baby's room will now pass down the B and Y leads and be received and amplified by the amplifier which is also connected to the B and Y leads. Of course more than one amplifier can be selected for connection to the B and Y leads.

The local subscriber then hangs up his telephone set, and with the retention of local battery from the audio interface and tone ringer 208 to the B and Y leads, both special service circuits remain powered and connected together by the B and Y leads.

In order to exit this special service, the local subscriber goes off hook and flashes his hook switch. The loop current detector 207 detects this and sends a corresponding signal to CPU 209, which sends a signal to audio interface and tone ringer 208, which removes local battery from the B and Y leads, thus disabling the remote special service circuits.

During the time that the special service circuits are connected to the B and Y leads, the line is split. Should ringing be received during this interval, the CPU recognizes this, and causes the audio interface and tone ringer 208 to apply ringing tone to the B and Y leads after signalling all amplifiers to be connected thereto, whereby ringing can be heard throughout the house in the environment of each of the amplifiers as described earlier.

When the local subscriber goes off-hook to answer the call, the tip and ring leads 101 and 103 are connected together as described earlier, and the baby monitoring special service is terminated. In order to reinitiate the special service, the local subscriber then re-dials the command signal, reconnecting the microphone and desired local speakers as before.

SPEED DIALING

The local subscriber flashes his hookswitch, and then dials a predetermined number designating the speed dial feature. He then dials a number e.g. between 0 and 9, indicating one of 10 stored numbers to be speed dialed out.

In this case, when the hookswitch is flashed, the line is split as described earlier, and the tip and ring leads 101 are terminated under control of the CPU sending a signal to line interface 202. Dialing the speed dial feature causes the CPU to access external interface 211, and port 212 to which a speed dialer is connected. The third digit dialed by the local subscriber causes the CPU to send a corresponding signal to the speed dialer 212, which responds by applying sequential digits back through external interface 211 to CPU 209, which applies a corresponding signal to line interface 202. The termination is opened and closed rapidly, simulating dial pulses, according to the selected number to be speed dialed out.

An "end of number" signal is then applied from the speed dialer which is received by the CPU, which causes the line split to be reconnected, connecting tip and ring leads 101 to tip and ring leads 103, and removing the line termination in line interface circuit 202, as described earlier. Ring back tone is received on the tip and ring leads which is heard by the local subscriber in his telephone handset.

Of course the CPU could also store, in its associated memory, signals corresponding to the last number dialed out from the local subscriber. In this case the stored number can be dialed out in substitution for the signal transmitted by the speed dialer.

DO NOT DISTURB

The subscriber can inhibit operation of any of the remote special service circuits. For example, the subscriber might wish to disable a remote special service circuit amplifier located in a bedroom in which a sleeping person is located. In this case, he would lift his handset, flash his switchhook, dial a predetermined command code indicating the special service "DO NOT DISBURB," and the single digit number indicating the remote special service circuit. The command code and single digit number are detected by loop current detector 207 or DTMF receiver 205 and applied to CPU 209 which stores the code and number in the CPU memory. He then flashes his switchhook to remove himself from the special service mode. As described earlier, the line is split with the hookswitch flash and the tip and ring leads 101 terminated. However in this case the CPU has stored in its memory an indication that the designated remote special service circuit is not to be activated under any circumstances. Thus upon receipt of ringing, the signalling circuit 210 does not emit an address corresponding to the designated special service circuit, and paging or other services which would use the designated remote special service circuit do not use it.

To restore the special service circuit to operation, following the switchhook flash a predetermined code designating the special service circuit, and designating that it should be reactivated is dialed, which removes the entry from the CPU memory, and with the following switchhook flash, the tip and ring leads 101 are reconnected to the tip and ring leads 103 through the line split circuit 203.

RINGING VOLTAGE DETECTOR

A schematic of the ringing voltage detector, element 201 in FIG. 2 is shown in FIG. 3. The inputs to a differential amplifier 301 are connected via capacitors 302 and 303 to the tip and ring leads T and R which lead to the local switching office. The output of the amplifier is connected to its inverting input via resistor 304 and its non-inverting input is connected to a d.c. voltage supply $V_c$ via resistor 305, to form a classic differential amplifier circuit.

The output of amplifier 301 is connected through resistor 306 in series with capacitor 307 to ground. The junction of resistor 306 and capacitor 307 is connected to the non-inverting input of a comparator 308, which has its inverting input connected to a reference voltage $V_R$. The output of comparator 308 is connected to the input of a buffer 309, the output of which is connected to a data bus. The data bus, which will be described in more detail below, is a standard data bus for connection to the central processing unit CPU 209.

Ringing signals are a.c. coupled to differential amplifier 301, and are passed via resistor 306 to the input of comparator 308. The reference voltage $V_R$ should be adjusted so that comparator 308 outputs square waves when the signal input on its non-inverting input is in excess of about 45 volts RMS.

The output of comparator 308 is passed through level adjusting buffer 309 to data bus signal level, which signal is applied to the data bus.

Capacitor 307 is relatively large, in order to bypass signals somewhat in excess of the ringing signal frequency, the bypassed signals almost entirely consisting of high voltage transients caused by lightening strikes, etc.

Since ordinary signals carried by the tip and ring leads are of considerably lower amplitude than the 45 volt RMS threshold referred to above, the presence of ringing signals on the tip and ring leads alone will cause an output signal on the data bus lead DB1.

LINE INTERFACE

The line interface circuit is comprised of means for terminating the tip and ring leads under control of the CPU, and also includes means for applying a DTMF signal (e.g., the speed dialer dialled signal) back to the local switching office.

FIG. 4 is a schematic of the preferred form of the line interface, element 202 in FIG. 2.

The tip and ring leads T and R are connected through a diode bridge circuit 401, the common cathode of which is connected to a resistor 402 which is connected in series with resistor 403 and capacitor 404 in parallel. The common anode of bridge 401 is connected to the emitter of a phototransistor 405 of an optocoupler 406. The collector of phototransistor 405 is also connected to resistor 403 and capacitor 404.

The common cathode of bridge 401 is connected to the collector of a transistor 407, which has its emitter connected through resistor 408 to the collector of phototransistor 405. The base of transistor 407 is connected through resistor 409 to the junction of resistors 402 and 403.

The secondary of a transformer 410 is connected in series with capacitor 411 across resistor 409. One terminal of the primary of transformer 410 is connected to a source of voltage $-V$, and the other terminal is connected through capacitor 412 to the output of a buffer 413. The input of buffer 413 is connected to data bus DB2.

Light emitting diode 414 of optocoupler 406 is connected between ground and the output of buffer 415, the input of which is connected to data bus lead DB3.

In order to effect a termination of the subscriber's line, a signal is received from the CPU on lead DB3. This is carried through buffer 415, which operates optocoupler 406, causing phototransistor 405 to become conductive. Central office battery current is thus conducted from the tip and ring leads via bridge 401, resistors 402 and 403 through the collector-emitter circuit of phototransistor 405. Registor 403 is of high value, e.g., 100K ohms. As a result transistor 407 is biased on, causing its emitter-collector circuit to become conductive.

Current therefore passes therethrough, since diode bridge 401 is in the same conductive direction as the base-emitter junction of transistor 407. Resistor 408 is of low resistance, e.g. 150 ohms.

The effect of the circuit, with the secondary of transformer 410 and capacitor 411 is to provide a terminating resistance to the subscriber's line which appears as if it is a telephone set in its off-hook condition.

The opposite polarity signal appearing on data bus lead DB3 causes phototransistor 405 to switch off, restoring the high impedance across the tip and ring leads.

When phototransistor 405 is conductive, signals can be applied to the tip and ring leads from the service circuit, for example for the application of multifrequency tone dialing to the switching office. The signals are applied on lead DB2 through buffer 413 and capacitor 412 to the primary of transformer 410, where they are coupled across resistor 409. This effectively applies the signals across resistor 403, with transistor 407 conducting, thus effectively applying them across the tip and ring leads through bridge 401.

Figure 5:
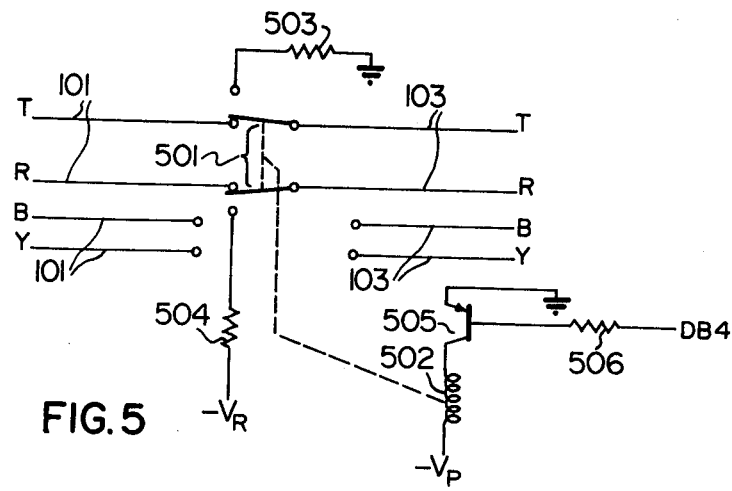
FIG. 5 is a schematic diagram of the line split.

The line split and battery feed circuit (reference 203 in FIG. 2) is shown in FIG. 5. The tip and ring leads 101 from the local switching office are passed through a pair of transfer contacts 501 associated with a relay coil 502. The transfer contacts are connected to the tip and ring leads 103 described with reference to FIG. 2.

Also shown are black B and yellow Y leads 103 which are not connected through to the B and Y leads 101 leading to the switching office. The latter two leads can be absent since they form no function in the present invention.

The normally open terminals of the transfer contacts 501 are connected respectively through resistor 503 to ground and through resistor 504 to a local battery supply $-V_p$. Typically this supply will be $-24$ volts to ground, for supplying local battery voltage to the subscriber's telephone set when split from the tip and ring leads 101.

Relay coil 502 is connected between supply source $-V_p$ to the collector of a transistor 505. The emitter of transistor 505 is connected to ground, and the base is connected through resistor 506 to a data bus lead DB4.

In operation, the CPU 209 applies a low level pulse to data bus lead DB4, which causes transistor 505 to switch on. Relay coil 502 conducts, causing transfer contacts 501 to transfer and connect the T and R leads 103 to the source of battery and ground through resistors 503 and 504. To reverse the transfer contacts, the voltage on lead DB4 is raised to ground, thus causing transistor 505 to shut off, stopping the current flow through relay coil 502, and restoring transfer contacts 501 to make the tip and ring leads 101 and 103 continuous.

DTMF AND AUDIO RECEIVERS

Figure 6:
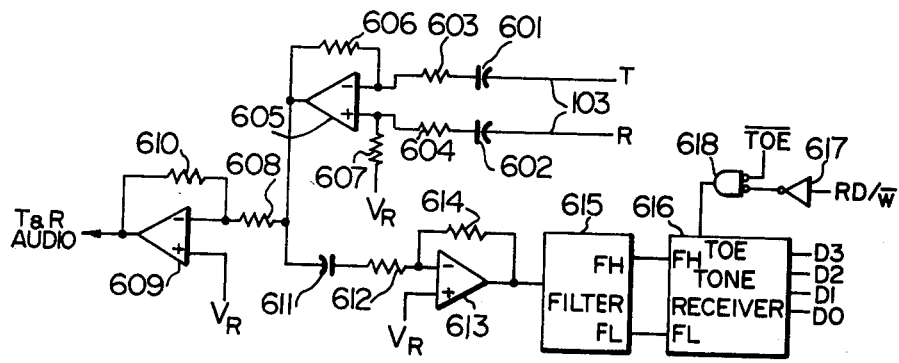
FIG. 6 is a schematic diagram of the audio receiver and DTMF receiver.

FIG. 6 is a schematic of a combined DTMF receiver and audio receiver, referenced 205 and 204 in FIG. 2. Tip and ring leads 103 are connected via capacitors 601 and 602 in series with resistors 603 and 604 to the input of operational amplifier 605. Operational amplifier 605 has a feedback resistor 606 connected between one input and its output and a further resistor connected between its other input and a source of reference voltage $V_R$.

The output of operational amplifier 605 is connected through resistor 608 to one input of operational amplifier 609. 609 has a feedback resistor 610 connected between one input and its output, its output carrying audio from the tip and ring leads 103, for application to the audio interface and tone ringing circuit (reference 208 in FIG. 2).

The output of operational amplifier 605 is also connected through the series circuit of capacitor 611 and resistor 612 to the input of operational amplifier 613, its non-inverting input being connected to a source of potential $-V_R$. A feedback resistor 614 is connected between the output of operational amplifier 613 and its inverting input.

The output of operational amplifier 613 is connected to the input of a DTMF filter 615, which separates the high and low band signalling frequencies, applying them respectively to the FH and FL outputs. These outputs are connected to similarly designated inputs of tone receiver 616. Tone receiver 616 decodes the tones and applies corresponding binary data signals on leads D0, D1, D2 and/or D3.

The tone receiver is enabled by the central processing unit via the RD/$\overline{W}$, a signal on which causes the tone receiver to read inputs to its FH and FL leads. The read/write lead is connected via buffer 617 to one input of AND gate 618, which has its other input connected to the $\overline{TOE}$ lead. The output of inverting AND gate 618 is connected to the TOE input of tone receiver 616.

In operation, either audio or multifrequency dialling signals are received on the tip and ring leads 103 from the local telephone set. These signals are coupled via capacitors 601 and 602 and resistor 603 and 604 to operational amplifier 605. The tones or audio signals are then coupled through resistor 608 and operational amplifier 609 to the audio interface circuit via the T&R audio lead.

The signals are also passed via capacitor 611 and resistor 612 (which rejects low frequency signals) through operational amplifier 613 to filter 615. This filter is a dual bandpass filter which passes signals in the two bands which contain the multifrequency dial signals. The two bands of signals are respectively applied to the FH and FL leads, and applied to tone receiver 616. Tone receiver 616 detects the multifrequency signalling signals, and generates binary signals corresponding to the DTMF signals. The binary signals are applied to lead D0-D3.

Filter 615 and tone receiver 616 are well known circuits, operating together in a well known fashion. The former typically can be filter type 8865 available from Mitel Corporation, and the tone receiver can be type 8860 available from the same source.

The tone receiver is of course operated from the CPU by appropriate signals on the read/write RD/$\overline{W}$ and $\overline{TOE}$ leads.

LOOP CURRENT DETECTOR

Figure 7:
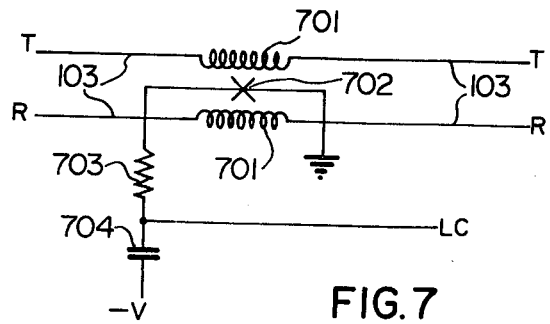
FIG. 7 is a schematic diagram of the loop current detector.

A loop current detector (reference 207 in FIG. 2) is shown in detail in FIG. 7. The circuit is comprised of a relay having a pair of bifilar wound windings 701. Each winding is connected in series with the tip and ring leads respectively. The relay contact 702 is connected between ground and a resistor 703, which itself is connected in series with capacitor 704 to a source of potential $-V$. Resistor 703 can be typically 100K ohms and capacitor 704 can be between 10 nanofarads and 0.1 microfarads. The capacitor and resistor 703 form a filter against passing current therethrough should there be a momentary accidental closure of relay contact 702.

In operation, the flow of line current to the local subscriber's set passes down the tip and ring leads. The relay comprising windings 701 operates in the presence of this current, closing associated contact 702. Ground is therefore extended through resistor 703 to lead LC. Any transients are bypassed via capacitor 704.

In the absence of current flow through windings 701, switch 702 opens, thus removing ground from the LC lead.

A bifilar wound relay is preferred, in order that longitudinal currents should be cancelled out by the magnetic fields set up by the windings.

The relay operates in the off-hook condition, and also repeats dial pulses, should the local telephone set be a dial pulse dialed type of telephone. The off-hook condition and dial pulses apply constant or pulsing ground potential on the LC lead.

AUDIO INTERFACE AND TONE RINGER

Figure 8:
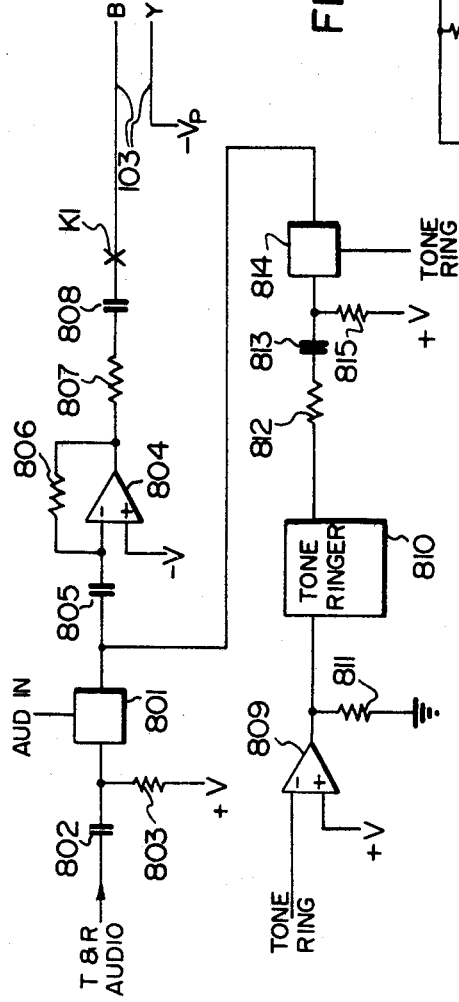
FIG. 8 is a schematic diagram of the audio interface and tone ringer.

The T and R audio leads at the output of operational amplifier 609 is connected to a switch (e.g. a CMOS switch) 801, through capacitor 802 in FIG. 8. The input to switch 801 is connected to a source of potential +V through resistor 803. The output of switch 801 is connected to operational amplifier 804 through capacitor 805, the output of operational amplifier 804 being connected to its inverting input through feedback resistor 806, and its non-inverting input being connected to potential source −V. Relay contact K1 is associated with relay coil K1R in FIG. 11.

The output of operational amplifier 804 is connected through resistor 807 in series with capacitor 808 and relay contact K1 to the black lead B; the yellow lead being connected to a source of potential −$V_p$.

An enable lead AUD IN causes switch 801 to operate. In addition, relay contact K1 closes the output path from operational amplifier 804 to the black lead.

The TONE RING lead (to which an enable signal is applied from the central processing unit when tone ringing is to be effected) is connected to the input of operational amplifier 809. The output is connected to the input of a tone ringer 810, e.g. type 8204, available from Mitel Corporation. The output of operational amplifier 809 is grounded through resistor 811. The output of tone ringer 810 is connected through resistor 812 in series with capacitor 813 to the input of a switch 814, such as a CMOS switch, having an enable input connected to the TONE RING lead, whereby the switch is caused to operate in response to application of the enable signal from the CPU to the aforementioned TONE RING lead, (the same enable signal being applied to the input of operational amplifier 809). The input of switch 814 is connected to potential +V through resistor 815. The output of switch 814 is connected with the output of switch 801 to capacitor 805.

In operation, a TONE RING enable input is applied to operational amplifier 809, which enables tone ringer 810, and at the same time closes switch 814. A ringing tone is generated and passes through resistor 812, capacitor 813 and switch 814 to capacitor 805. The signal further passes through operational amplifier 804, resistor 807 and capacitor 808 through switch contact K1 (assuming the K1 relay is closed) to the black lead. Ringing tone is thereby carried to the black and yellow leads for amplification and acoustic transmission to a listener via a remote special service circuit.

Similarly, audio from the tip and ring leads 103 (FIG. 6) passing through operational amplifier 609 and the T&R audio leads passes through capacitor 802 and switch 801 (assuming that this switch has been operated in response to an enable pulse on the AUD IN lead. The signal then passes through operational amplifier 804 to the black and yellow leads, as described with reference to the tone ringer.

SIGNALLING CIRCUIT

Figure 9:
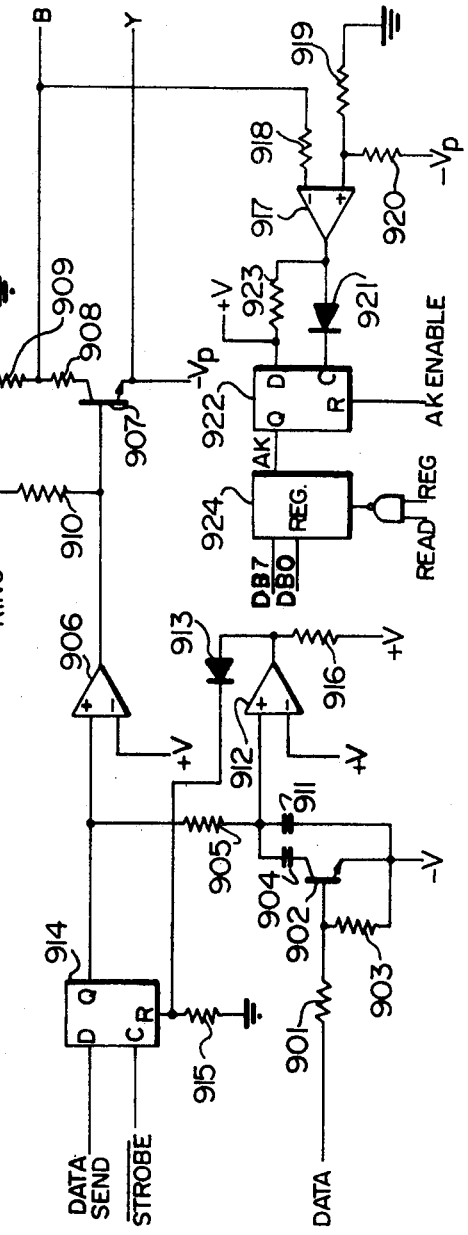
FIG. 9 is a schematic diagram of the signalling circuit, portion of the CPU.

A DATA lead for receiving commands including address signals from the central processing unit is connected via resistor 901, in FIG. 9, to the base of transistor 902 which has its emitter connected to voltage source −V and its base connected thereto for bias through resistor 903. Its collector is connected through capacitor 904 and resistor 905 to the non-inverting input of operational amplifier 906, which has its inverting input connected to voltage source +V. The output of operational amplifier 906 is connected to the base of a level shifting transistor 907 which has its emitter connected to a voltage source −$V_p$ (which can be −24 volts), and its collector is connected through series resistors 908 and 909 to ground. Its base is also connected to ground through resistor 910.

The black lead B is connected to the junction of resistors 908 and 909 and the yellow lead is connected to −$V_p$. Each of resistors 908 and 909 (e.g., 200 ohms) set the line impedance for the black and yellow leads.

A capacitor 911 is connected between the junction of capacitor 904 and resistor 905 and voltage source −V. The junction is also connected to the non-inverting input of operational amplifier 912, which has its inverting input connected to voltage source +V. The output of operational amplifier 912 is connected through diode 913 to the reset R input of flip flop 914. The reset input is connected to ground through resistor 915 and the anode of diode 913 is connected to a voltage source +V through resistor 916. The D input of flip flop 914 is connected to a DATA SEND input and the C input of flip flop 914 is connected to a $\overline{\text{STROBE}}$ lead, both of the latter leads receiving DATA ENABLE and STROBE signals respectively from the CPU 209.

In operation, data is received from the CPU via a latch to be described later and is coupled through transistor 902 to the input of operational amplifier 906. The signal is also coupled through operational amplifier 912 to the reset input of flip flop 914, which has its Q output high, facilitating signal transmission through operational amplifier 906, upon receipt of the DATA SEND and STROBE signals respectively at the input of flip flop 914. The latter circuit therefore forms both an enable and synchronization function for the data to be transmitted.

The synchronized data signal is thus transmitted through operational amplifier 906 and transistor 907, where it forms pulses applied to the black B and yellow Y leads, which change from data voltage level to line −$V_p$ level.

Part of the data transmitted to the remote special service circuit could be a request for acknowledgement. According to the preferred embodiment of this invention, the acknowledgement consists of a brief short circuiting of the line. This is sensed by operational amplifier 917, which has its inverting input connected via resistor 918 to the black B lead, and which has its non-inverting input connected to the junction of a voltage divider comprising resistors 919 and 920, connected between ground and the voltage source −$V_p$.

The output of operational amplifier 917 is connected through diode 921 to the C input of flip flop 922, and to the D input though resistor 923. The latter D input is connected to a voltage source +V.

The Q output of flip flop 922 is connected to an AK lead, and the R input of flip flop 922 is connected to an AK ENABLE lead.

The ratio of resistor values of resistors 920 and 919 and 908 and 909 establish the threshold at which operational amplifier 917 transmits a signal. When the black B and yellow Y leads short, as by a remote special service circuit presenting an acknowledgement, the output of operational amplifier 917 goes to high potential, allowing diode 921 to conduct and present a clock signal to flip flop 922. When the output of operational amplifier 917 returns to low potential, the pulse terminates and diode 921 becomes non-conductive. The flip flop is read out and reset upon a signal being received on the AK ENABLE lead which is connected to the rest R input of flip flop 922. The acknowledgement pulse thus appears on the AK lead.

The acknowledgement output signal from flip flop 922 is applied via the AK lead to a read register 924. This register is enabled upon receipt of a read signal on its read lead and a register signal from the CPU register, and outputs its contents on data bus lead DB7 and DB0, which is accessed by the central processing unit.

OUTWARD DIALING

Figure 10:
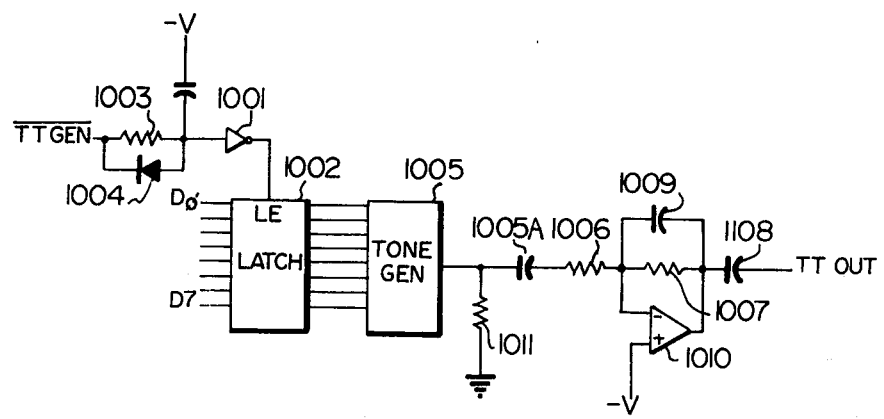

Multifrequency signals are generated by the system using the circuit shown in FIG. 10. A $\overline{\text{TT GEN}}$ lead receives an enable signal which passes through inverter 1001 to the latch enable LE input of latch 1002. The signal is applied to inverter 1001 through the parallel circuit of resistor 1003 and diode 1004. The inputs to latch 1002 are connected to data bus leads D0-D7.

The outputs of latch 1002 are connected to corresponding inputs of tone generator 1005. The latch can be type 374 and the tone generator type 2559, both being available from Mitel Corporation.

The output of tone generator 1005 is applied through a high pass filter comprising the series circuit of capacitor 1005A, resistor 1006, resistor 1007 and capacitor 1008, resistor 1007 having capacitor 1009 in parallel thereof, and being connected between the output and inverting input of operational amplifier 1010, and the output of tone generator 1005 being bypassed to ground through resistor 1011.

In operation, a data signal for generating the required output tones is applied from the central processing unit to data bus lead D0-D7, which signal is latched in latch 1002. The latch is enabled by a signal on the $\overline{\text{TT GEN}}$ lead, which applies the latched bits to the input of tone generator 1005. As a result a dual tone signal is passed through the aforenoted filter and is present on the TT OUT lead. This lead is connected to buffer 413, described earlier with reference to FIG. 4. The resulting DTMF signal is applied to the tip and ring leads for transmission to the central office.

CPU INTERFACE

Figure 11:
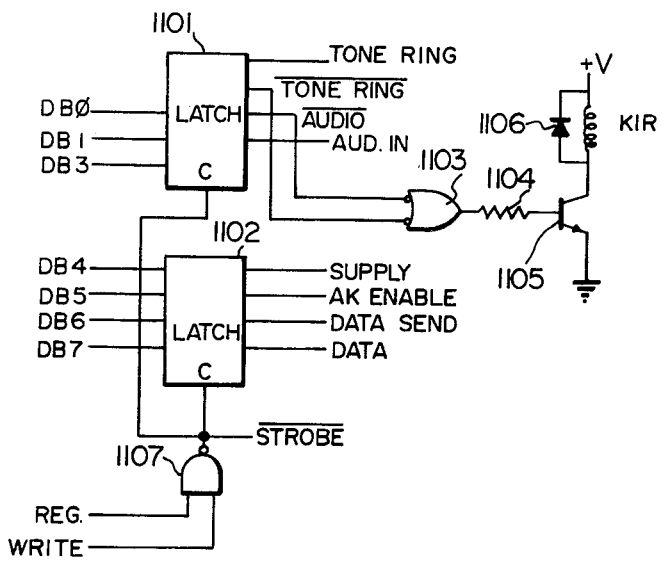
FIG. 11 is a schematic diagram of an interface portion of the CPU.

An interface circuit which is part of the CPU block referenced 209 in FIG. 2 is shown in FIG. 11. This circuit is used to enable the circuits described above. A pair of latches 1101 and 1102 have their inputs connected to data bus leads DB0-DB7. While four bit latches have been shown, thus requiring a pair of latches, a single 8 bit latch could be used in its place.

The outputs of the latches are indicated as TONE RING, $\overline{\text{TONE RING}}$, AUDIO, AUD IN, SUPPLY, AK ENABLE, DATA SEND and DATA. The $\overline{\text{TONE RING}}$ and $\overline{\text{AUDIO}}$ leads are connected to inputs of an inverting OR gate 1103, which has its output connected through resistor 1104 to the base input of transistor 1105. The emitter of transistor 1105 is connected to ground, assuming it is of npn type, and its collector is connected through relay coil K1R to a voltage source +V. The relay coil K1R is bypassed by diode 1106, in the usual manner.

The clock inputs of latches 1101 and 1102 are connected to the output of NAND 1107, which has its inputs connected to a REG and WRITE lead. The REG lead is connected to a register, to be described later, and the WRITE lead is connected to the CPU.

In operation, signals are applied on the data bus from the CPU to latches 1101 and 1102. As a result, enable and other signals are applied on its output leads. The TONE RING output is connected to the TONE RING input to operational amplifier 809 in FIG. 8, and to the TONE RING enable input of switch 814 in FIG. 8, the AUD IN output is connected to the AUD IN enable input of switch 801 in FIG. 8, the supply output is connected to a power supply switch on circuit which can be used with this invention, but is not shown, the AK ENABLE output lead is connected to the AK ENABLE input lead of flip flop 922 in FIG. 9, the DATA SEND output is connected to the DATA SEND input connected to flip flop 914, in FIG. 9, and the DATA output is connected to the DATA input to transistor 902 in FIG. 9.

Signals on the $\overline{\text{TONE RING}}$ and $\overline{\text{AUDIO}}$ leads cause operation of relay K1R. As noted earlier, the relay contacts K1 are associated with relay coil K1R so as to close the audio path to the black and yellow leads B and Y in FIG. 8.

CPU

FIG. 12 shows the major portion of the central processing unit, in FIG. 2. The CPU is comprised of a microprocessor 1201, which has its address and data terminals A0-A2 and D0-D7 connected to the corresponding leads of the address and data buses.

Associated with the microprocessor are memories comprising a pair of read only memories ROM 1202 and 1203, and random access memory RAM 1204, each of which has address A0-A10 leads and data D0-D7 leads connected to the corresponding leads of an address and data bus.

In addition, a latch 1205 has its $\overline{\text{E}}$ input connected via an inverter 1206 to the VMA output of microprocessor 1201. The microprocessor is driven by a crystal 1207.

The microprocessor is connected to the memories and to latch 1205 in a well known way, and consequently all of the details of the interconnection circuit will not be described. However the outputs of latch 1205, which interface the memories and which strobe the various peripheral circuits described earlier, etc., are labelled as ROM 2, ROM 1, as $\overline{\text{STROBE 2}}$, $\overline{\text{STROBE 1}}$, TOE/WATCH DOG, $\overline{\text{TT GEN}}$, and RAM.

A well known WATCH DOG circuit 1208 for providing regular interrupts to the microprocessor 1201 is connected thereto. An output of WATCH DOG circuit 1208 is connected to an enable input of supply switch 1209. This circuit provides operating voltage for the circuits of the central control, i.e. +5 V to ground, described earlier as the supply voltage +V. The supply switch also is well known, and provides a reset pulse on power up of the circuit.

The ROM memories store signals which are accessed by the microprocessor in order to facilitate the functions described earlier by each of the circuits. A person skilled in the art understanding this invention, and having read the functional description above, is assumed to be able to generate the firm ware stored in each of the ROM's, or to instruct a programmer to do the same. The RAM, of course, stores representations of signals received on the data bus from the microprocessor and peripheral units, and is accessed as required under control of the microprocessor, when directed by the signals stored in the ROM's. Microprocessor 1201 preferably is type 6802, available from Motorola, Inc., although other microprocessors could be used.

REMOTE SPECIAL SERVICE CIRCUIT

As noted earlier with respect to FIG. 1, certain of the remote special service circuits 105 or 106 contain an amplifier and speaker. The circuit, once enabled, can receive signals from the black and yellow B and Y leads 103, which can be ringing tone, audio signals for amplification, etc. FIG. 13 is a schematic diagram of such a circuit.

The remote special service circuit is connected via a connector to the black and yellow leads 103. The black lead is connected through capacitor 1301 and volume control potentiometer 1302 in series with resistor 1303 to the base input of transistor 1304, and via resistor 1305 to the base input of transistor 1306. The collectors of transistors 1304 and 1306 are connected to opposite leads of the primary of a transformer 1307, e.g. 20K ohms to 8 ohms impedance. The base of transistor 1304 is connected to its collector through the series circuit of resistor 1308 and capacitor 1309.

The base of transistor 1306 is connected to the tap of a voltage divider comprising resistor 1310 and 1311, which is connected between potential $-V$ and the yellow lead Y of lead pair 103.

The emitters of transistors 1304 and 1306 are connected together through capacitor 1312 and the resistor portion of potentiometer 1313. The slider tap of potentiometer 1313 is connected to the collector of transistor 1314, and its emitter is connected to the yellow Y lead through resistor 1315. The base of transistor 1314 is connected to the yellow lead through the series circuit of three diodes 1316, which provide a limiting function for the base of transistor 1314. This base is also connected via resistor 1317 to the emitter of transistor 1318, which has its collector connected to voltage source $V_1$. The base of transistor 1318 is connected to an ON/OFF lead.

Power is supplied to the circuit via the center tap of the primary of transformer 1307, which is connected to ground, through the collector-emitter circuits of the two transistors, potentiometer 1313, the collector-emitter circuit of transistor 1314, to the yellow Y lead, to which is connected $-24$ V from the central control. As will be recognized by a person skilled in the art, the circuit involving transistor 1304 and 1306 operate in push-pull, when powered, driving a speaker 1319 connected to the secondary of transformer 1307.

An ON or OFF voltage level is applied to the ON/OFF lead to transistor 1318, which causes its collector-emitter circuit to conduct, and positive voltage to be applied to the base of transistor 1314, the voltage level being limited by diodes 1316. As a result, transistor 1314 conducts in its collector-emitter circuit, allowing current to be conducted from the yellow lead through to ground via transformer 1307.

Singals applied to the black and yellow leads are conducted via capacitor 1301 to transistors 1304 and 1306 operating in push-pull, the voltage being controlled by potentiometer 1302. The audio frequency signals which are thereby amplified can be ringing tone signals, audio paging signals, etc.

When the voltage level applied to the base of transistor 1318 drops below cut-off, transistor 1314 is inhibited, and the conduction of current therethrough is stopped. Accordingly the audio amplifier does not amplify any further audio signals appearing on the black and yellow leads.

It should be noted that the enabling circuit comprising transistors 1318 and 1314 need not be connected to an amplifier, but could just as easily be connected to a relay coil for operating a relay, thereby turning a remotely controlled apparatus on or off. In this case, the collector of transistor 1314 is connected to a relay coil K2, as shown in FIG. 13A.

FIG. 14 is a schematic diagram of the control circuit for the remote special service circuit. A power supply of conventional construction has its inputs connected to the black B and yellow Y leads, and provides various voltages for use by the circuit of FIG. 14, FIG. 13 and FIG. 13A, i.e. $-V_p$, typically $-24$ volts, $-V_1$, $-8$ volts, $-V_R$, $-16$ volts, and 0 volts, shown as ground, but which is not intended to be other than an internal ground or voltage bus.

The data bits are applied via the black B lead and resistor 1402 to the inverting input of operational amplifier 1403, which has its non-inverting input connected via resistor 1404 to voltage $-V_p$ and via resistor 1405 to ground. The voltage division provided by resistors 1404 and 1405 establish a threshold, data bits exceeding this threshold being passed by operational amplifier 1403. This operational amplifier acts as a data buffer.

The output data from operational amplifier 1403 is connected to the DATA input to decoder 1406. The output lead of operational amplifier 1403 is connected to voltage $-V_1$ via resistor 1407.

Decoder 1406 decodes the data bits into parallel form, and applies them via data lines 1408 to the inputs of comparator 1409. The comparing inputs are connected to ground via a plurality of miniswitches 1410, and to voltage source $-V_p$ via resistors 1411. The encoded signal appearing on leads 1408 are compared with those switches 1410 which are closed by comparator 1409, and if the decoded data signal matches, the comparator outputs a signal to AND gate 1412. A further input of AND gate 1412 provides a signal when the parity is correct, to be described below. When AND gate 1412 operates, it applies a signal to flip flop 1413. The Q output of flip flop 1413 is the ON/OFF lead, which was described as the enable input in FIG. 13 and FIG. 13A.

Accordingly, data received on the black B and yellow Y leads 103, passing through buffer 1403 and decoded in decoder 1406 which matches the address set up by switches 1410 for this specific remote special service circuit causes an on/off, high or low signal to appear on the ON/OFF lead, which causes the power switch transistor 1314 in FIG. 13 or 13A to turn the amplifier or relay K2 on or off. The amplifier being thus connected across the black and yellow leads, broadcasts whatever audio signals appear thereacross. Relay K2, having a switch contact (not shown) connected in series with a main power supply to a power outlet or to wired powered leads, thus can turn the power on or off.

It should be noted that a further decode output lead 1414 is connected to a reset input of flip flop 1413. The data signal received on the black and yellow leads can thus be effective to specifically reset flip flop 1413, thus turning off the amplifier or relay which was in its on state.

The encoded data signal appearing on the black and yellow leads could also request an acknowledgement from the remote special circuit, which, in this preferred embodiment, is a momentary short circuiting of the black and yellow leads which is received at the central control, described earlier. The decoded bit from decoder 1406 appears on lead 1415, which lead is connected to one input of AND gate 1416. Another input lead of AND gate 1416 is connected to the output of AND gate 1412, and a third input is connected to voltage source $-V_1$. Accordingly AND gate 1416 is enabled if three conditions are satisfied; that power has been applied to the black and yellow leads from the central control, resulting in a signal on the $-V_1$ lead, that the present remote special service circuit has been specifically addressed, resulting in an output signal from AND gate 1412, and also that a specific request for an acknowledgement signal has been received, which results in a signal on lead 1415. The output of AND gate 1416 thus goes high, which is applied through resistor 1417 to the base of Darlington pair 1418. The collector and emitter of Darlington pair 1418 are connected across the black and yellow leads. Thus for the duration of the acknowledgement request bit on lead 1415, Darlington pair 1418 conducts, short-circuiting the black and yellow leads. This short circuit is detected by the circuit involving operational amplifier 917 and flip flop 922 described earlier with reference to FIG. 9. The acknowledgement thus is transferred to the central control.

The circuit of FIG. 14 also conducts a parity check to ensure that the data signal which it receives on the black and yellow leads is error free. The ouput of buffer 1403 is connected through an RC filter 1419 to one input of AND gate 1420. A second input of AND gate 1420 is connected to the $\overline{CLK}$ lead, to be described later, and a third input of AND gate 1420 is connected to a voltage source $-V_1$. The filter simply provides a time constant, adding up the "1" data bits, and once a threshold has passed for operation of AND gate 1420, it is enabled. A signal is outputted to the D input of flip flop 1421 in synchronization with the clock lead input. The output of flip flop 1421 is connected to the second input of AND gate 1412, thus allowing it to operate flip flop 1413, and thus the ON/OFF function, only if parity has been checked.

A further lead to AND gate 1412 inhibits its operation until the circuit knows that the complete data word has been received. This is provided by a flip flop 1422 which has a timer on its reset, the timer being in excess of the length of the longest form of data bit, i.e., 45 microseconds. The output of buffer 1403 which carries the data is applied to the clock C input of flip flop 1422, and also to the input of transistor 1423 via resistor 1424. A timing capacitor 1425 is connected between the collector and emitter of transistor 1423, its emitter being connected to voltage source $-V_p$. The collector is connected to the Q output of flip flop 1422 through resistor 1426, and is also connected to the non-inverting input of operational amplifier 1427, which has its inverting input connected to a reference voltage $-V_R$. The output of operational amplifier 1427 is connected to the reset R input of flip flop 1422, and to voltage source $-V_1$ through resistor 1428.

The $\overline{Q}$ output of flip flop 1422 is connected to the clock C input of flip flop 1429, which has its Q output connected to the third input of AND gate 1412. The Q output of flip flop 1422 is connected to the clock C input of flip-flop 1430, the output of which is connected to the reset input of decoder 1406 and to the reset input R of flip flop 1421. The output of flip flop 1432 is connected to its own reset R input via resistor 1430 and to potential $-V_p$ through capacitor 1431.

In operation, each data bit is applied as a clock pulse to flip flop 1422. Each data bit is also applied to transistor 1423, the pulses being integrated by capacitor 1425. When the resulting voltage exceeds the threshold $-V_R$, operational amplifier 1427 operates, applying a reset pulse to flip flop 1422. As soon as flip flop 1422 has reset, the $\overline{Q}$ output goes to high level, providing a signal which is applied to the clock input of flip flop 1429. This signal is in turn applied to the input of AND gate 1412.

It should be noted that capacitor 1425 will charge from the Q output of flip flop 1422 when it is high. Consequently if a following data pulse is applied to transistor 1432, its collector-emitter circuit short circuits capacitor 1425, thus discharging it. Consequently the threshold of operational amplifier 1427 is not exceeded, and flip flop 1422 is not reset. Each succeeding data pulse repeats this function.

However, once the data stream has ended, no further data bits are applied to transistor 1423, and capacitor 1425 is allowed to charge up, to the point at which operational amplifier 1427 conducts, thus resetting flip flop 1422, thus resulting in the enabling of AND gate 1412, and the generation of an ON/OFF signal at the Q output of flip flop 1413. Thus the time constant of the combination of resistor 1426 and capacitor 1425 must be greater than the maximum data bit period, whereby the voltage acquired by capacitor 1425 prior to reception of the next data bit is less than the threshold of operational amplifier 1427.

It is preferred that data "1" should be a 20 microsecond period at high level, following by a 10 microsecond period at low level, whereas a data "0" should be a 10 microsecond period at high level, followed by a 20 microsecond period at low level. One byte thus would use 240 microseconds, followed by a 50 microsecond silent period, followed by a 4 microsecond acknowledgement period, followed by a 50 microsecond silent period.

A high level on the Q output of flip flop 1422 is also applied to the clock input of flip flop 1430. A high level pulse thus appears on the Q output, which is applied to the RESET inputs of decoder 1406 and flip flop 1421. Thus each time the data stream has ended, AND gate 1412 is enabled, causing the local amplifier or power switch to turn on or off. When flip flop 1422 is reset, and its Q output goes high, flip flop 1430 is clocked, thus resetting decoder 1406 to receive further data. Flip flop 1430 is reset upon capacitor 1431 charging with a high level on the Q output on flip flop 1430, during a time interval controlled by the RC time constant of resistor 1430 and capacitor 1431. Consequently the reset signal applied to decoder 1406 and flip flop 1421 appears as a pulse.

It should be noted that in place of the amplifier in FIG. 13 or the relay of FIG. 13A, a microphone and amplifier feeding the black and yellow leads could have been enabled. In this manner a telephone set or other amplifier could monitor signals received from the local microphone. Accordingly a baby monitor or such system can be implemented.

DIALING FORMATS

In a successful prototype of the invention, the following dialing formats, to provide the features indicated below, were used.

Feature Dialing

1. Intercom:   a. FX where
         F = flash-hook
         X = 1–5 (Station #)
   b. F77 where
         F = flash-hook
         77 = all stations
2. Paging: F7X where
         F = flash hook
         7 = paging feature
         X = 8, 9, 0
   a. Page all:   F78
   b. Page all inside:   F79
   c. Page all outside:   F70
3. 1-Way Monitoring: F8XY where
         F = flash hook
         8 = 1-way feature
         X = 1–5 (device)
         Y = 1–5 (station)
   a. Monitor device 2 from station 3: F823
   b. Disable monitoring: F8
4. 2-Way Door; F8X where
         F = flash-hook
         8 = 2-way feature
         X = 6, 7, 8 (door)
   a. 2-way with front door:   F86
   b. 2-way with back door:   F87
5. Power Contacts: F9XY where
         F = flash-hook
         9 = Power contact feature
         X = 1–8 (Device #)
         Y = 0/1 (off/on)
   a. Set device contact #1 = F911
   b. Reset device contact #2 = F920
6. Speed Dialing: F6X where
         F = flash-hook
         6 = Speed dial feature
         X = 0–9
   a. Speed dial entry #5: F65
   b. Last number re-dial: F60

NOTE:
A subscriber flash-hooks to enter feature dialing and flash-hooks to exit feature dialing. Two or more features can be executed without flash-hooking between features.

The central control can be programmed to inhibit or allow operation of any of the remote special service circuits upon further request, which is stored until changed in the central control RAM, as follows, which format was used in a successful prototype.

Program Dialing

A three digit access code must be dialed to enter program mode. This access code has the following format:

FOXY where
   1st digit is always 0
   X = 0–9
   Y = 0–9
1. Selective ringing and paging: FXYZ where
         F = flash-hook
         X = 1–5 (station #)
         Y = 0/1 (ringing)
         Z = 0/1 (paging)
   a. Don't ring hor page station 2:   F200
   b. Don't ring but page station 3:   F301
   c. Ring but don't page station 4:   F410
   d. Ring and page station 5:   F511
2. Speed dialing: F6XY where:
         F = flash hook
         6 = speed dial prog.
         X = 1–9 (entry #)
         Y = 0–9 (Digit,) up to 20 digits
   a. enter:   F6XY
   b. delete:   F6X
   c. verify:   F60XY
3. Remote Access: F7XYZ where
         F = flash-hook
         X = 0–9
         Y = 0–9
         Z = 0–9
   a. Enable remote access by entering access code 789: F789
   b. Disable remote access: F7

NOTE:
A subscriber must go on-hook to exit programming mode: flash-hook is a delimiter for selective ringing/paging, speed-dialing, and remote access.

A tone format which was used in a successful prototype was as follows:

1. Hold:
   (a) on-hook
     4 beeps of tone ringing, 500 ms on/off every 60 seconds. After 3 minutes call is dropped.
   (b) off-hook
     4 beeps of DTMF, 250 ms on/off every 60 seconds, until answered.
2. Incoming Call:
   (a) on-hook
     Tone ringing on 2 seconds, off 4 seconds until call is answered or abandoned.
   (b) off-hook (in split mode)
     2 beeps of DTMF, 250 msec on/off every 6 seconds, until call answered or abandoned.
3. Intercom:
   1. second of tone ringing.
4. Remote Access enabled:
   6 beeps of tone ringing, 500 ms on/off every 30 seconds until remote access diabled.
5. Error tone:
   DTMF every 125 ms until on-hook.
6. Programming Access code ack:
   1 second of DTMF
7. Remote Access:
   a. access code ack: 1 second of DTMF
   b. Power contact ack: 1 second of DTMF
   c. Interdigit timeout: 4 beeps of DTMF, 250 ms on/off.

The address and command signals have successfully taken the following format: bit 1, a request for acknowledgement from the remote special service circuit; bits 2-6, contain data bits of the remote special service circuit address; bit 7 is an on/off command bit, and bit 8 is a parity bit.

The external interface 211 described with reference to FIG. 2 can be any well known input-output interface, connected to the data bus of the CPU. A speed dialer, such as type available from Mitel Corporation is suitable. The external interface can also have an RS232 interface.

It should be noted that while the preferred embodiment described above utilizes a telephone line which is split between the switching office and local telephone line, another form of the invention can have the telephone line continuous. In this case the tip and ring leads 101 and 103 are continuous, and central control 102 does not exist as shown in FIG. 1. In this embodiment, central control 102 is connected in parallel with the tip and ring, black and yellow leads, similar to circuits 105 and 106. However each special service circuit 105 to which a local telephone set 104 is connected contains a splitting circuit. Consequently when a telephone set goes off hook, it is not connected to the tip and ring leads immediately. The telephone set can be connected directly to the black and yellow leads, whereby all digits dialed are recognized by the central control, which activates remote special service circuits described above. However, upon dialing a predetermined digit, such as the digit 9, or, alternatively, flashing the switchhook, a local detector in each of the special service circuits 105 detecting the predetermined digit or switchhook flash switches the telephone set 104 to the tip and ring leads. Upon being connected thereto, the central switching office dial tone is heard in the handset, and the local telephone set can then dial an outgoing call.

However, in the case of an incoming call, ringing is detected by the central control in a manner similar to that described above, and ringing tone is applied to addressed remote special service circuits containing amplifiers, connected to the black and yellow leads. Any telephone set can then access the tip and ring leads, thus completing the call connection.

The invention described above thus acts as a 1 trunk PABX for the home, providing a multiplicity of special services not previously available via the local home telephone system wiring.

The present system thus allows the system to provide intercom and paging, outgoing calls, simple paging, speed dialing, last number redial (which number is recoded by the CPU and which can be accessed for outdialing), it can handle incoming calls, call hold, call transfer to other telephone sets connected to the local telephone line, add-on conference, tone-to-pulse conversion, door answering, baby monitoring, remote paging, allows a subscriber to turn lights on and off, close or lock doors, by using the special power contact remote special service circuit. Access to the central processing unit can be made from an external location, and upon dialing a security code, any of the features can be controlled from the external location, i.e., paging, remote switch turn-on or off. The central control can also contain a real-time clock, which can activate a voice synthesis module, which can be accessed by one of the subscribers telephone sets, to obtain the time of day in local language. Indeed, the central control can be programmed to ring one or more telephone set at any predetermined time. Further, by means of the RS232 interface, a computer or other data controlled apparatus can be accessed. Further, a music input can be provided in order to provide music on the on-hold to a held line connected to the tip and ring leads.

A person understanding this invention may now conceive of other embodiments or variations. All are considered within the sphere and scope of the invention as defined in the claims appended hereto.

The embodiments of the invention in which an exclusive property or privilege is claimed are defined as follows:

1. A service circuit for a local telephone line having quad telephone conductors, a first two conductors of which are connected to a subscriber's line connected to a remote switching machine, comprising:
   (a) means for splitting said two conductors of the local telephone line from the subscriber's line,
   (b) means for connecting a telephone to the first two conductors, and one or more special service circuits to the second two conductors,
   (c) means for applying an enabling signal to a predetermined one or more of said special service circuits on the second two conductors upon receipt of one or more predetermined command signals from the first two conductors, and
   (d) means for connecting said first two of the conductors to said second two conductors whereby a communication link between said two pairs of conductors is established, isolated from the remote switching machine.

2. A service circuit for a local telephone line having quad telephone conductors, a first two conductors of which are connected to a subscriber's line connected to a remote switching machine, comprising:
   (a) means for splitting said two conductors of the local telephone line from the subscriber's line,
   (b) means for connecting a telephone to the first two conductors, and one or more special service circuit to the second two conductors,
   (c) means for applying an enabling signal to a predetermined one or more of said special service circuits on the second two conductors upon receipt of one or more predetermined command signals from the first two conductors,
   (d) means for connecting said first two of the conductors to said second two conductors whereby a communication link between said two pairs of conductors is established, isolated from the remote switching machine, and
   (e) means for disconnecting the first two of the conductors from the second two conductors and reestablishing a connection between the first two conductors and the subscriber's line, while maintaining any special service circuit connected thereto operative.

3. A service circuit as defined in claim 2, further including means for applying operating power for the special service circuits to the second two conductors, and for ceasing the application of said operating power to the second two conductors upon receipt of a command signal from the first two conductors.

4. A service circuit as defined in claim 3, further including means for removing operating power from the second two conductors after a predetermined period of time.

5. A service circuit for a local telephone line having quad telephone conductors, a first two conductors which are connected to a subscriber's line connected to a remote switching machine, comprising:
   (a) means for splitting the local telephone line from said subscriber's line, on receipt of a first command signal, on the first two of said conductors,
   (b) means for addressing, enabling and providing local battery for one or more remote special service circuits on the second two of the conductors upon receipt of a second command signal from the first two of the conductors, whereby a special service circuit connected to the local telephone line and isolated from the remote switching machine can be enabled, (c) a tone ringer, (d) a ringing voltage detector connected to the subscriber's line, (e) means for generating said first command signal and said second command signal which is designative of one or more of said special service circuits in response to detection of ringing signals by the ringing voltage detector, and (f) means for connecting the tone ringer to the second two conductors for transmission of ringing tone to said special service circuits.

6. A service circuit as defined in claim 5, further including means for receiving said first command signal from the first two telephone conductors and for inhibiting generation of said second command signal designative of one or more of said special service circuits in response thereto, and for receiving other predetermined command signals from the first two telephone conductors and for removing the inhibition of the generation of said second command signal in response thereto.

7. A service circuit as defined in claim 5 or 6, wherein said one or more remote special service circuits further comprise an amplifier and a speaker connected to its output, and means for connecting the input of the amplifier to said second two conductors in response to being enabled by said means for addressing, enabling and providing local battery.

8. A service circuit as defined in claim 5 or 6, wherein said one or more remote special service circuits further comprise a power switch adapted to be connected to an external device, and means for enabling the power switch in response to being enabled by said means for addressing, enabling and providing local battery.

9. A service circuit for a local telephone line having quad telephone conductors, a first two conductors of which are connected to a subscriber's line connected to a remote switching machine, comprising:

(a) at least one telephone set connected to the first two conductors, (b) a plurality of remote special service circuits connected to the second two conductors, at least one being comprised of an amplifier, a speaker connected to the output of the amplifier, an amplifier enabling means connected to the second two conductors for enabling the amplifier to receive audio signals from the second two conductors, (c) a tone ringer, (d) a central control for receiving ringing signals, splitting the first two conductors from the subscriber's line in response thereto, applying command signals to the second two conductors for enabling the amplifier enabling means, and applying an output signal from the tone ringer to the second two conductors for reception and amplification by the amplifier during the duration of the ringing signals, and including means for sensing an off-hook condition on the first two conductors during the reception of said ringing signals, and in response thereto for inhibiting the application of the output signal from the tone ringer to the second two conductors and reconnecting the first two conductors to the subscriber's line.

10. A service circuit as defined in claim 9 in which the central control further includes means for detecting predetermined control signals received from said telephone set on said first two conductors, and in response thereto, for splitting the first two conductors from the subscriber's line, applying power to the second two conductors, applying command signals corresponding to the control signals to the second two conductors for enabling the operation of a first predetermined one of the remote special service circuits.

11. A service circuit as defined in claim 10, in which said first predetermined one of the remote special service circuits includes a power switch for operating an external device which may be connected to said power switch.

12. A service circuit as defined in claim 10, including means for enabling individual ones of the plurality of remote special service circuits upon receipt of different command signals from the central control, each of the individual ones of said remote special service circuits including a switch operated upon said latter circuit being enabled for operating an external device which may be connected thereto.

13. A service circuit as defined in claim 10, including means for connection of the first two conductors to the second two conductors for establishing an audio signal path therebetween, whereby said audio signals are amplified by said enabled remote special service circuit.

14. A service circuit as defined in claim 13, in which the central control further includes means for detecting an on-hook condition on the first two conductors following detection of said command signals thereon, and in response thereto, for ceasing the application of power to the second two conductors to inhibit said remote special service circuits and for reconnecting the first two conductors to the subscriber's line.

15. A service circuit as defined in claim 14, in which the central control is comprised of:

(a) an interface circuit connected between the first two conductors and the subscriber's line, the interface circuit comprising:
  i. an audio receiver, dialing signal receiver and loop current detector connected to the first two conductors,
  ii. a ringing voltage detector and line interface circuit connected to the subscriber's line,
  iii. a line split circuit connected between the first two conductors and the subscriber's line, (b) an audio interface circuit, a tone ringer and a signalling circuit connected to the second two conductors, and (c) a central processing unit including a memory for storing an operation look-up table for generating control signals for application to the second two conductors in response to the detection of control signals on the first two conductors, connected to the audio receiver, dialing signal receiver, loop current detector, ringing voltage detector, line interface circuit, line split circuit, audio interface circuit, tone ringer and signalling circuit for operation thereof in response to the reception of said control signals.

16. A service circuit for a local telephone line having quad telephone conductors, a first tip and ring lead pair of which are continuous with a subscriber's line connected to a remote switching machine, comprising:

(a) a plurality of special service circuits connected to the local telephone line, at least one being comprised of an amplifier, a speaker connected to the output of the amplifier, an amplifier enabling means connected to the amplifier and the local telephone line for enabling the amplifier to receive audio signals from the telephone line, (b) detecting means and means for connecting a telephone set to the tip and ring leads upon detection by the detecting means of a predetermined signal from the telephone set, and for connecting the telephone set to the remaining two conductors in the absence of detection of said predetermined signal, and (c) a control circuit connected to the local telephone line for receiving command signals from the telephone line, and in response applying address and control signals to the telephone line for the enabling and activation of said amplifier enabling means, whereby in the absence of detection of said predetermined signal, said command signals and audio signals are generated by the remote switching machine or the telephone set and received from said telephone line and applied to said amplifier, and whereby in the event said telephone set generates said predetermined signal it is connected to the tip and ring leads for the completion of a call to or from the remote switching machine.

17. A service circuit for a local telephone line as defined in claim 16, in which at least one remote special service circuit is comprised of a power switch and a power switch enabling means connected to the power switch and the local telephone line for enabling the power switch to turn on or off, the control circuit being adapted to receive second command signals from the telephone line, and in response to apply address and control signals to the telephone line for enabling and activation of the power switch to turn it on or off.

18. A service circuit for a local telephone line having quad telephone conductors, a first two conductors of which are connected to a subscriber's line connected to a remote switching machine, comprising:

(a) means for splitting said two conductors of the local telephone line from the subscriber's line, (b) means for connecting a telephone to the first two conductors, and for connecting one or more special service circuits being comprised of an amplifier and a speaker connected to its output, to the second two conductors, (c) means for applying an enabling signal to a predetermined one or more of said special service circuits on the second two conductors upon receipt of one or more predetermined command signals from the first two conductors, (d) means in said special service circuits for receiving said enabling signal and for connecting the input of the amplifier to said second two conductors in response to the reception of said enabling signal, and (e) means for connecting said first two of the conductors to said second two conductors whereby a communication link between said two pairs of conductors is established, isolated from the remote switching machine.

19. A service circuit for a local telephone line having quad telephone conductors, a first two conductors of which are connected to a subscriber's line connected to a remote switching machine, comprising:

(a) means for splitting said two conductors of the local telephone line from the subscriber's line, (b) means for connecting a telephone to the first two conductors, and one or more special service circuits being comprised of a power switch, to the second two conductors, (c) means for applying an enabling signal to a predetermined one of said one or more special service circuits on the second conductors upon receipt of one or more predetermined command signals from the first two conductors, (d) means in said special service circuits for receiving said enabling signal and for enabling the power switch in response to the reception of said enabling signal, and (e) means for connecting said first two of the conductors to said second two conductors whereby a communication link between two pairs of conductors is established, isolated from the remote switching machine.

* * * * *